United States Patent
Roth

(10) Patent No.: US 7,634,770 B2
(45) Date of Patent: Dec. 15, 2009

(54) KERNEL MODULE INTERFACE DEPENDENCIES

(75) Inventor: Steven Roth, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1525 days.

(21) Appl. No.: 10/440,154

(22) Filed: May 19, 2003

(65) Prior Publication Data

US 2004/0237080 A1 Nov. 25, 2004

(51) Int. Cl.
*G06F 9/44* (2006.01)
(52) U.S. Cl. ...................................... 717/170
(58) Field of Classification Search ................... 717/170
See application file for complete search history.

(56) References Cited

U.S. PATENT DOCUMENTS

| | | | |
|---|---|---|---|
| 5,634,058 A | 5/1997 | Allen et al. | |
| 5,778,226 A | 7/1998 | Adams et al. | |
| 5,956,507 A | 9/1999 | Shearer, Jr. et al. | |
| 6,381,735 B1 | 4/2002 | Hunt | |
| 6,769,117 B2 * | 7/2004 | Moore | 717/130 |
| 7,076,770 B2 * | 7/2006 | Handal | 717/136 |
| 2003/0145127 A1 * | 7/2003 | Unice | 709/321 |

OTHER PUBLICATIONS

Leffler, Samuel J., et al., "Building Berkeley UNIX Kernels with Config.", Computer Systems Research Group, Department of Electrical Engineering and Computer Science, University of California, Berkeley, CA. Apr. 17, 1991.

* cited by examiner

*Primary Examiner*—Eric B Kiss

(57) ABSTRACT

A method, and a corresponding mechanism, are used for resolving interface dependencies in kernel modules during an operating system (O/S) update. The method includes determining the O/S version for which each module is designed, determining a version of the updated O/S, comparing the O/S version for which each module is designed to the version of the updated O/S, and removing from the system those modules that are not compatible with the updated O/S.

12 Claims, 5 Drawing Sheets

KERNEL MODULE INTERFACE DEPENDENCIES

TECHNICAL FIELD

The technical field is processes and mechanisms used in configuring UNIX® operating systems. More particularly, the technical field relates to processes and mechanism for defining dependencies among kernel modules.

BACKGROUND

One central component of a computer system operating in a UNIX® environment is an operating system kernel. In a typical UNIX® system, many applications, or processes may be running. All these processes use a memory-resident kernel to provide system services. The kernel manages the set of processes that are running on the system by ensuring that each such process is provided with some central processor unit (CPU) cycles when needed by the processes and by arranging for each such process to be resident in memory so that the process can run when required. The kernel provides a standard set of services that allows the processes to interact with the kernel and to simplify the task of the application writer. In the UNIX® environment, these services are sometimes referred to as "system calls," because the process calls a routine in the kernel (system) to undertake some specific task. Code in the kernel will then perform the task for the process, and will return a result to the process. In essence, the kernel fills in the gaps between what the process intends to happen, and how the system hardware needs to be controlled to achieve the process's objective.

The kernel's standard set of services is expressed in a set of kernel modules (or simply, modules). The kernel typically includes modules such as drivers, including Streams drivers and device drivers, file system modules, scheduling classes, Streams modules, and system calls. These modules are compiled and subsequently linked together to form the kernel. Subsequently, when the system is started or "booted up," the kernel is loaded into memory.

In many UNIX® operating systems, a common practice is for one module to depend on the services provided by another module. For example, module A may depend of the services provided by module B. Existing practice calls for the definition of module A to explicitly state its dependency on module B. This allows kernel configuration mechanisms to enforce the dependency and to ensure that the modules in the kernel are self-consistent.

In the discussion that follows, a module means any separately configurable unit of kernel code; a system file means a flat text file that contains administrator configuration choices, in a compact, machine-readable format; and module metadata means data that describes a module's capabilities and characteristics, including its dependencies.

SUMMARY

What is disclosed is a method for resolving interface dependencies in kernel modules during an operating system (O/S) update. The method begins with the step of determining, for each module, the O/S version for which the module was designed. Next, the version of the updated O/S is determined. The method continues with determining which of the modules are compatible with the updated O/S by comparing the O/S version for which each module was designed to the version of the updated O/S.

Also disclosed is a computer-readable medium including a routine for managing dependencies between kernel modules and an operating system (O/S) interface. When executed, the routine includes the steps of determining, for each module, the O/S version for which the module was designed, determining the version of the updated O/S, and determining which of the modules are compatible with the updated O/S by comparing the versions.

Finally, what is disclosed is mechanism for resolving kernel module interface dependencies. The mechanism includes a receiving device that receives descriptions of modules, and an operating system (O/S) update module that compares a version of a module with a version of the O/S to determine compatibility with an updated O/S.

DESCRIPTION OF THE DRAWINGS

The detailed description will refer to the following figures in which like numerals refer to like items, and in which.

DETAILED DESCRIPTION

In typical UNIX® systems, a kernel is initially built with a basic set of modules. The basic set of modules should comprise at least those modules needed to provide the standard set of services to applications. However, additional modules may be built into the kernel according to a system administrator's requirements and specifications. For example, an administrator may prefer to load certain device driver modules based on the frequency of usage of those modules.

Figure 1:
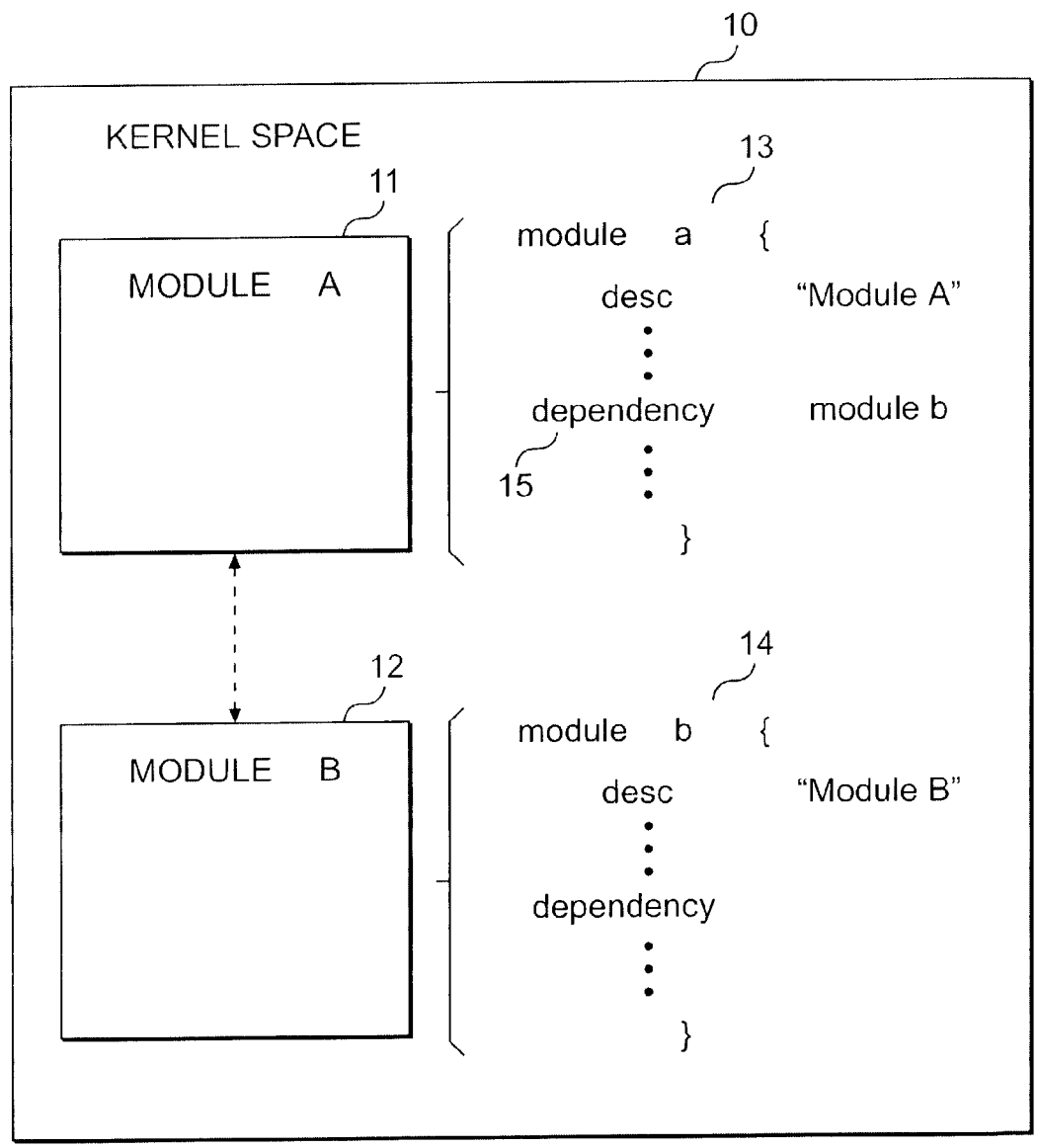
FIG. 1 is a diagram illustrating module dependencies in a UNIX® system.

In at least one current UNIX® environment, the operating system kernel is a collection of just under 300 modules. Each module contains executable code and data to provide some service in the kernel. Some modules are required by design of the operating system; others are chosen by a system administrator. Each of these modules may depend on other modules and interfaces. In such modular operating system kernels, a common practice is for individual modules to specify dependencies among other modules. Thus, if module A depends on module B, module A's description will explicitly state a dependency on module B. This explicit statement of dependencies allows the kernel to properly manage its modules by enforcing the dependencies and ensuring that the modules are self-consistent. In prior art operating system kernels, such dependencies could be found in a separate file, often referred to as a master file. In an improvement disclosed in copending application entitled "Self-Describing Kernel Modules," assigned to the instant assignee, filed on even date herewith, and hereby incorporated by reference, the description of the modules is provided with the kernel code of the individual modules, so that the modules are self-describing. FIG. 1 illustrates a simple version of this self-describing environment in which kernel 10 includes Module A (11), which depends on Module B (12). Included in a description 13 of Module A (11) is its dependency 15 on module B (12). However, Module B (12) has no stated dependencies, as indicated in its description 14.

Returning to the example illustrated in FIG. 1, Module B (12) has no stated dependencies. However, all modules may have at least one interface dependency. If no interface dependency is stated in the module's description, a dependency on an operating system interface may be implied. Such an implied dependency may cause the module to be removed when a later version of the operating system is installed.

As an improvement over the simple environment illustrated in FIG. 1, a mechanism, and a corresponding method, allow a module definition to list the services (or interfaces) on which the module depends, rather that to explicitly state its dependencies in terms of specific modules that provide those services. As a specific example, all modules in the kernel depend on an interface to the operating system (O/S). The interface may be provided by a specific module. In an embodiment, the interface to the O/S is provided by a kconfig module. However, other modules in the kernel need not "know" which module provides the O/S interface. Rather, each module's definition, or modmeta file, can state a dependency on the O/S interface. Alternatively, the modules need not state any dependency, and a dependency on the O/S interface would be implied. Such dependency schemes allow kernel configuration mechanisms to still have sufficient information to enforce dependencies, but modules no longer need to be aware of which other modules provide the needed services or interfaces.

Figure 2:
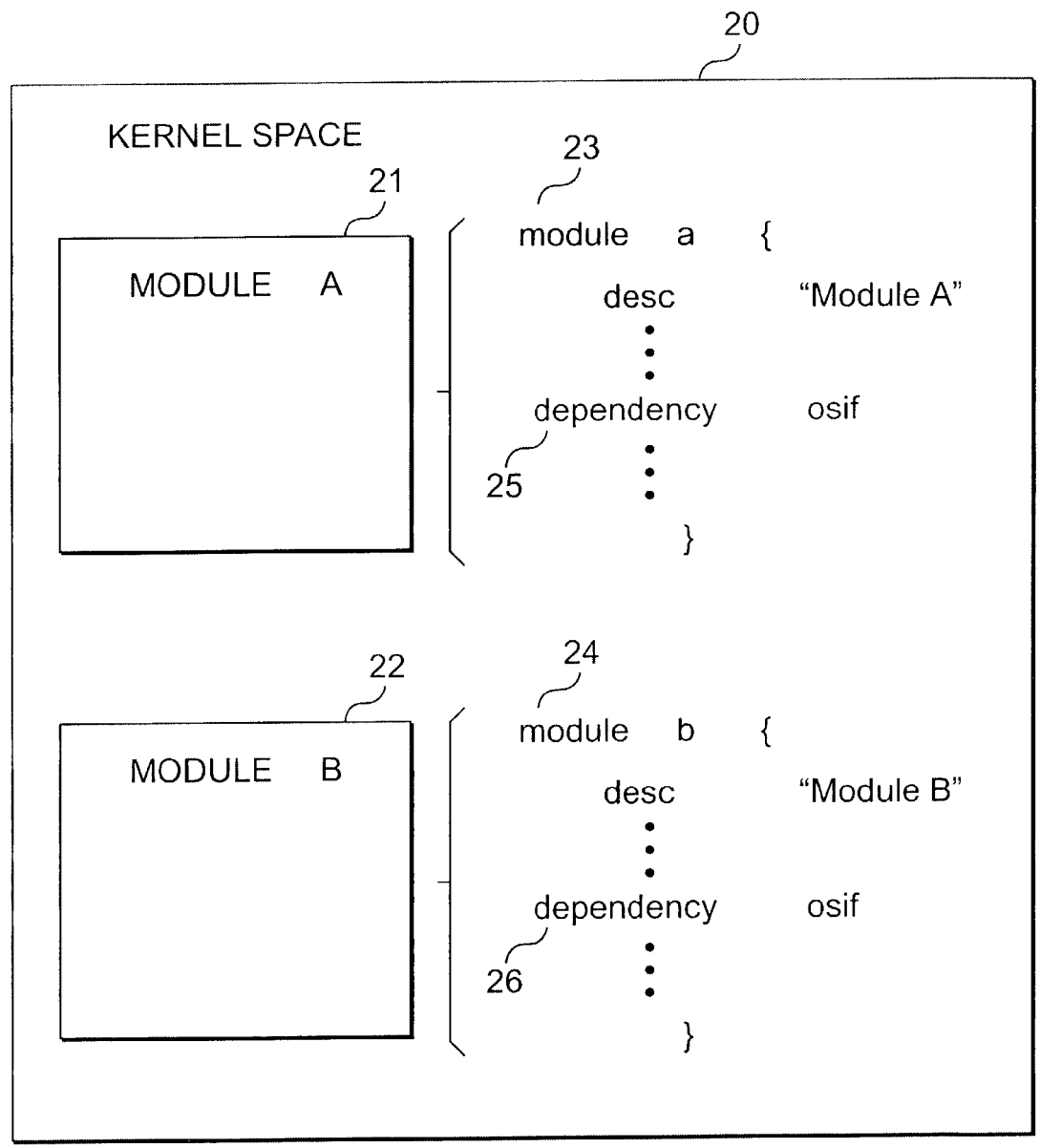
FIG. 2 is a diagram illustrating an alternative technique for indicating module dependencies in a UNIX® system.

FIG. 2 illustrates this improved mechanism for indicating module dependencies. In FIG. 2, kernel 20 includes Module A (21) and Module B (22). A definition 23 of Module A (21) includes, as a dependency 25, an interface to the O/S. Correspondingly, a definition 24 of Module B (22) includes, as a dependency 26, the interface to the O/S. In effect, the definitions establish a dependency of Module A (21) and Module B (22) on the O/S interface, but without the respective definitions 23 and 24 explicitly stating the source of the module (i.e., the kconfig module) providing the O/S interface.

The implication of the situation illustrated in FIG. 2 is that a operating system developer will find that updating the operating system is much easier because the developer is freed from the burden of determining which of the modules in the kernel are compatible with the updated operating system, and therefore should be retained, and which of the modules are incompatible with the updated operating system, and therefore should be removed. That is, each of the modules states the services the module needs, independently of the version of the operating system that supplies those services. An operating system update mechanism can then correlate the stated import/export dependencies, and determine which modules should be retained and which should be removed.

Figure 3:
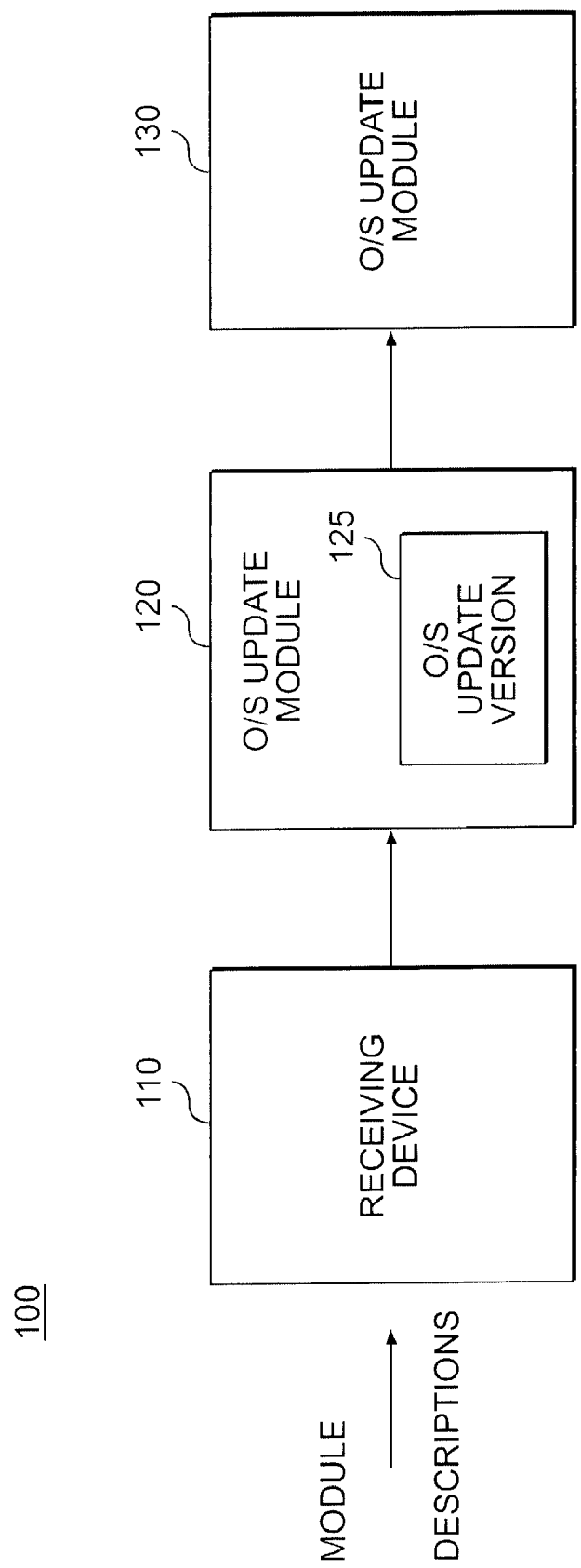
FIG. 3 is a block diagram of an embodiment of a mechanism for determining module compatibilities during an operating system update.

FIG. 3 illustrates an improved mechanism 100 for managing kernel module interfaces in an updated operating system environment. In FIG. 3, the mechanism 100 is applied to kernel 20 (from FIG. 2), including Module A (21) and Module B (22), and to the kconfig module (not shown). The mechanism 100 includes a receiving device 110 that reads the descriptions 23 and 24, and the kconfig definition, and notes the stated dependencies in terms of services required and services provided. As noted above, one such required service is the O/S interface, provided by the kconfig module. An operating system (O/S) update module 120 includes a definition, including the version identification, of an updated version of operating system 125. The O/S update module 120 can determine which of the required and provided services are supported. The O/S update module compares the stated versions of Module A (21) and Module B (22) to the version of the updated O/S, and determines which of the modules are compatible with the updated O/S. Using this information, the O/S update module can determine which of the modules to remove, and which to retain with the kernel.

Figure 4:
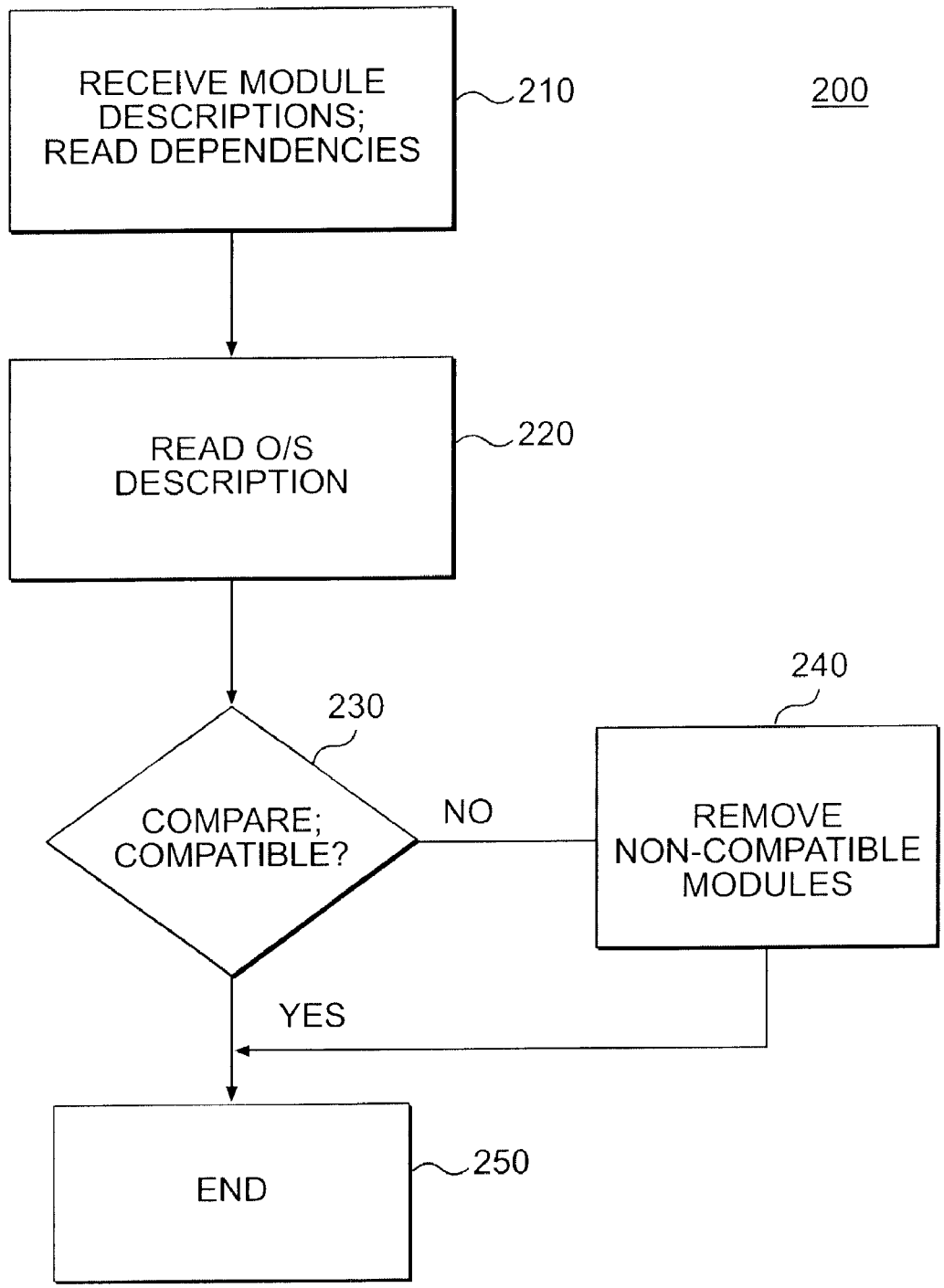
FIG. 4 is flow chart illustrating a method for determining module compatibilities executed by the mechanism of FIG. 3.

FIG. 4 is a flowchart illustrating a routine 200 for determining compatibility of dependencies with the updated version of operating system 125. The routine 200 starts by receiving module descriptions, block 210. The module descriptions state what services are either required or provided, or both, by the associated modules. The descriptions also state the versions of the modules. In block 220, the O/S update module 120 reads the O/S description 125, noting the O/S version. In block 230, the updated O/S version is compared to the dependencies determined in block 220. If all dependencies match (are compatible) with the updated version of O/S 125, the routine 200 moves to block 250 and ends. If any dependency is non-compatible, the routine 200 moves to block 240, and the module with a non-compatible dependency is removed from the system. The routine 200 then moves to block 250 and ends.

Figure 5:
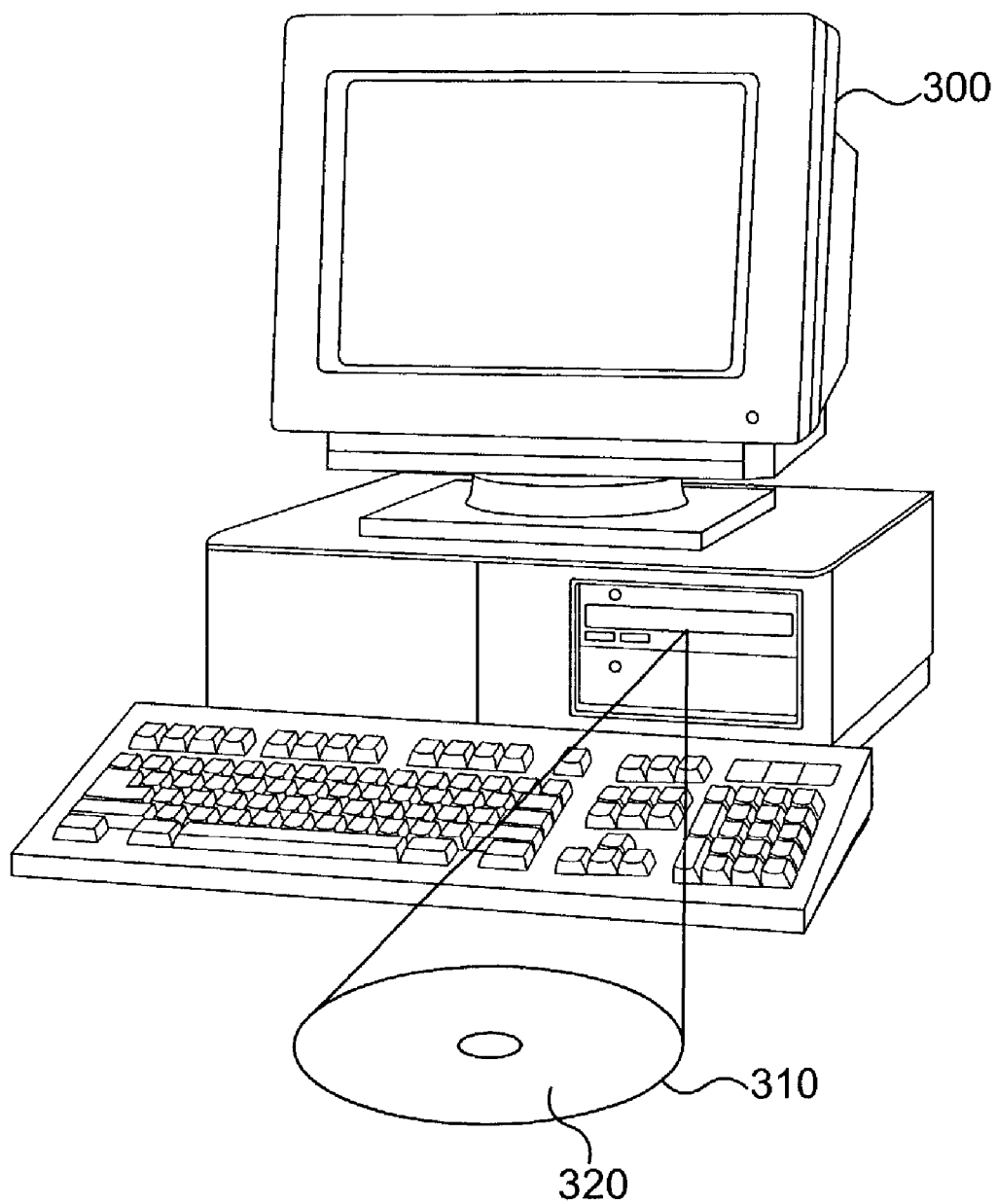
FIG. 5 illustrates a computer-readable medium including routines to execute the method of FIG. 4.

FIG. 5 shows a computer system 300 usable for developing a UNIX® operating system. To implement the mechanism 100 for determining module interface dependencies, a computer readable medium 310 is provided with appropriate programming 320, including the receiving device 110, the O/S module 120, and the O/S update module 130 (shown in FIG. 3). The programming 320 operates on the existing kernel and their associated descriptions to determine interface dependencies.

The computer readable medium 300 may be any known medium, including optical discs, magnetic discs, hard discs, and other storage devices known to those of skill in the art. Alternatively, the programming required to implement the mechanism 100 may be provided using a carrier wave over a communications network such as the Internet, for example.

I claim:

1. A computer-implemented method for updating an operating system O/S by resolving interface dependencies in kernel modules, comprising:
   determining an O/S version for which each module is designed;
   determining a version of the updated O/S;
   determining which modules are compatible with the updated O/S, comprising comparing the O/S version for which each module is designed to the version of the updated O/S; and
   using the determination of compatible modules, retaining the compatible modules in the O/S and removing the non-compatible modules.

2. The method of claim 1, wherein the updated O/S comprises an O/S interface, and wherein each module depends on the O/S interface.

3. The method of claim 2, wherein each module includes a module description, and wherein the module description comprises an explicit indication of dependency on the O/S interface.

4. The method of claim 2, wherein each module includes a module description, and wherein the module description comprises an implicit indication of dependency on the O/S interface.

5. The method of claim 2, wherein the O/S interface is provided by a kconfig module.

6. The method of claim 1, wherein determining the O/S version for which each module is designed comprises receiving a description of the module, the description including an indication of a requisite O/S version.

7. A computer-readable medium comprising a computer-implemented routine for updating a computer operating system (O/S) by managing dependencies between kernel modules and an O/S interface, the routine when executed comprising the steps of:
  determining an O/S version for which each module is designed;
  determining a version of the updated O/S;
  determining which modules are compatible with the updated O/S, comprising comparing the O/S version for which each module is designed to the version of the updated O/S; and
  using the determination of compatible modules, retaining the compatible module in the O/S and removing the non-compatible modules.

8. The computer-readable medium of claim 7, wherein the updated O/S comprises an O/S interface, and wherein each module depends on the O/S interface.

9. The computer-readable medium of claim 8, wherein the O/S interface is provided by a kconfig module.

10. The computer-readable medium of claim 7, wherein each module includes a module description, and wherein the module description comprises an explicit indication of dependency on the O/S interface.

11. The computer-readable medium of claim 7, wherein each module includes a module description, and wherein the module description comprises an implicit indication of dependency on the O/S interface.

12. The computer-readable medium of claim 7, wherein determining the O/S version for which each module is designed comprises receiving a description of the module, the description including an indication of a requisite O/S version.

* * * * *